US009849411B2

(12) United States Patent
Sheridan

(10) Patent No.: US 9,849,411 B2
(45) Date of Patent: Dec. 26, 2017

(54) SCAVENGE FILTER SYSTEM FOR A GAS TURBINE ENGINE

(71) Applicant: United Technologies Corporation, Hartford, CT (US)

(72) Inventor: William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 304 days.

(21) Appl. No.: 14/703,918

(22) Filed: May 5, 2015

(65) Prior Publication Data
US 2015/0343346 A1 Dec. 3, 2015

Related U.S. Application Data

(60) Provisional application No. 62/003,659, filed on May 28, 2014.

(51) Int. Cl.
*F01D 25/20* (2006.01)
*B01D 35/00* (2006.01)
(Continued)

(52) U.S. Cl.
CPC ........... *B01D 35/005* (2013.01); *B01D 29/52* (2013.01); *B01D 35/14* (2013.01); *B01D 35/26* (2013.01);
(Continued)

(58) Field of Classification Search
CPC ................. F01D 25/20; F05D 2260/98; F05D 2260/607; F16N 39/02; F16N 39/06;
(Continued)

(56) References Cited

U.S. PATENT DOCUMENTS

| 4,199,443 | A | * | 4/1980 | Tauber | B01D 29/17 210/304 |
| 4,891,934 | A | * | 1/1990 | Huelster | F16N 7/40 184/6.11 |

(Continued)

FOREIGN PATENT DOCUMENTS

| EP | 2166196 | 3/2010 |
| GB | 1301282 | 12/1972 |

OTHER PUBLICATIONS

European Search Report for European Patent Application No. 15169628.3 completed Sep. 23, 2015.
(Continued)

*Primary Examiner* — Ninh H Nguyen
(74) *Attorney, Agent, or Firm* — Carlson, Gaskey & Olds, P.C.

(57) ABSTRACT

A scavenge filter system according to an exemplary aspect of the present disclosure includes, among other things, a first scavenge pump stage positioned in a first flow path downstream of a first bearing compartment of a spool and a second scavenge pump stage positioned in a second flow path downstream of a second bearing compartment. The second bearing compartment houses a geared architecture mechanically coupled to the spool. A first scavenge filter fluidly couples the first scavenge pump stage to at least one oil reservoir. A second scavenge filter fluidly couples the second scavenge pump stage to the at least one oil reservoir. The first and second scavenge filters are separate and distinct. A method of filtering debris is also disclosed.

23 Claims, 4 Drawing Sheets

(51) Int. Cl.
*B01D 29/52* (2006.01)
*B01D 35/26* (2006.01)
*B01D 35/14* (2006.01)
*F02C 7/06* (2006.01)
*F16N 39/06* (2006.01)
*F16N 39/02* (2006.01)
*F01M 1/02* (2006.01)
*F01M 1/10* (2006.01)

(52) U.S. Cl.
CPC .............. *F01D 25/20* (2013.01); *F01M 1/02* (2013.01); *F02C 7/06* (2013.01); *F16N 39/02* (2013.01); *F16N 39/06* (2013.01); *F01M 2001/1057* (2013.01); *F01M 2001/1071* (2013.01); *F05D 2260/607* (2013.01); *F05D 2260/98* (2013.01); *F16N 2200/04* (2013.01); *F16N 2210/12* (2013.01); *F16N 2210/14* (2013.01); *F16N 2250/32* (2013.01)

(58) Field of Classification Search
CPC ............. F16N 2200/04; F16N 2210/12; F16N 2210/14; F01M 1/02; F01M 2001/1057; F01M 2001/1071
See application file for complete search history.

(56) References Cited

U.S. PATENT DOCUMENTS

| | | |
|---|---|---|
| 5,121,599 A | 6/1992 | Snyder et al. |
| 5,610,341 A | 3/1997 | Tortora |
| 6,712,080 B1 * | 3/2004 | Handschuh ........... B08B 9/0321 134/103.1 |
| 7,163,086 B2 | 1/2007 | Care et al. |
| 7,886,875 B2 * | 2/2011 | Shevchencko .......... F01D 21/10 184/6.11 |
| 8,235,176 B2 | 8/2012 | Hannaford et al. |
| 2008/0099388 A1 * | 5/2008 | Frost .................... B01D 29/114 210/167.04 |
| 2011/0147322 A1 * | 6/2011 | Payne .................... F01D 25/18 210/805 |
| 2013/0098058 A1 | 4/2013 | Sheridan |

OTHER PUBLICATIONS

Rolls Royce (2005). The Jet Engine. Rolls Royce Technical Publication. p. 181.

* cited by examiner

SCAVENGE FILTER SYSTEM FOR A GAS TURBINE ENGINE

CROSS-REFERENCE TO RELATED APPLICATION

The present disclosure claims priority to U.S. Provisional Patent Application No. 62/003,659, filed May 28, 2014.

BACKGROUND

This application relates to oil filtration within a gas turbine engine and, more particularly, to scavenge filter systems.

Typical gas turbine engines include a fan delivering air into a bypass duct as propulsion air and to be utilized to cool components. The fan also delivers air into a core engine where it is compressed in a compressor. Compressed air is then delivered into a combustion section where it is mixed with fuel and ignited. Products of the combustion pass downstream over turbine rotors, driving them to rotate. The gas turbine engine includes one or more bearing compartments for supporting rotation of a spool mechanically coupling the compressor and the turbine rotors to each other.

Each bearing compartment receives a quantity of oil for lubricating surfaces of the bearing compartment. The quantity of oil can be scavenged by a pump that is mechanically driven by an engine rotor through a gear train, which returns the heated oil to an oil tank or reservoir. Debris and other contaminants within the oil may be filtered from the oil before the oil is recirculated to the bearing compartment.

SUMMARY

A scavenge filter system according to an example of the present disclosure includes a first scavenge pump stage positioned in a first flow path downstream of a first bearing compartment of a spool, a second scavenge pump stage positioned in a second flow path downstream of a second bearing compartment, the second bearing compartment housing a geared architecture mechanically coupled to the spool, a first scavenge filter fluidly coupling the first scavenge pump stage to at least one oil reservoir, and a second scavenge filter fluidly coupling the second scavenge pump stage to the at least one oil reservoir. The first and second scavenge filters are separate and distinct.

In a further embodiment of any of the foregoing embodiments, the first and second flow paths combine downstream of the first and second scavenge pump stages into a shared flow path. The shared flow path is distributed between the first and second scavenge filters.

A further embodiment of any of the foregoing embodiments includes a pressure filter and a heat exchanger each located in a third flow path between the oil reservoir and the first and second bearing compartments.

In a further embodiment of any of the foregoing embodiments, at least one of the first and second scavenge filters is operable to filter to a first level, and the pressure filter is operable to filter to a second level less than the first level.

In a further embodiment of any of the foregoing embodiments, a ratio of the first level to the second level is between about 40:1 and about 1.33:1.

In a further embodiment of any of the foregoing embodiments, the first level is equal to or greater than about 100 microns.

In a further embodiment of any of the foregoing embodiments, the first level is between about 100 microns and about 200 microns, and the second level is between about 5 microns and about 75 microns.

A further embodiment of any of the foregoing embodiments includes a first debris monitor operable to detect debris in the first scavenge filter, and a second debris monitor operable to detect debris in the second scavenge filter.

In a further embodiment of any of the foregoing embodiments, fluid flow in the first flow path defines a first rate, and fluid flow in the second flow path defines a second rate greater than the first rate.

In a further embodiment of any of the foregoing embodiments, the at least one oil reservoir is at least a first oil reservoir and a second oil reservoir. The first flow path defines a first filtration circuit and the second flow path defines a second filtration circuit fluidly isolated from the first filtration circuit. The first scavenge filter and first bearing compartment is located in the first filtration circuit, and the second scavenge filter and second bearing compartment is located in the second filtration circuit.

A gas turbine engine according to an example of the present disclosure includes a fan section including a fan shaft coupled to a fan, a low speed spool and a high speed spool mounted for rotation within a plurality of spool bearing compartments, the low speed spool mechanically coupling the fan section and a compressor section to a turbine section, a geared architecture housed within a gear bearing compartment and mechanically coupling the fan to the low speed spool to drive the fan at a lower speed than the low speed spool, and a scavenge filter system. The scavenge filter system includes a plurality of spool scavenge pump stages each positioned downstream and fluidly coupled to one of the spool bearing compartments, a gear scavenge pump stage positioned downstream and fluidly coupled to the gear bearing compartment, a spool scavenge filter fluidly coupling the spool scavenge pump stages to at least one oil reservoir, and a gear scavenge filter fluidly coupling the gear scavenge pump stage to the at least one oil reservoir. The spool and gear scavenge filters are separate and distinct.

In a further embodiment of any of the foregoing embodiments, flow paths defined by the spool scavenge pump stages and a flow path of the gear scavenge pump stage combine downstream of the spool and gear scavenge pump stages into a shared flow path distributed between the spool and gear scavenge filters.

In a further embodiment of any of the foregoing embodiments, fluid flow in the gear bearing compartment is greater than a combined fluid flow in the spool bearing compartments.

A further embodiment of any of the foregoing embodiments includes: a pressure filter and a heat exchanger located in a flow path between the at least one oil reservoir and the spool and gear bearing compartments.

In a further embodiment of any of the foregoing embodiments, at least one of the spool and gear scavenge filters is operable to filter to a first level, and the pressure filter is operable to filter to a second level less than the first level.

A further embodiment of any of the foregoing embodiments includes an accessory gearbox mechanically coupling the spool and gear pump stages to one of the spools, and the spool scavenge filter fluidly coupling the accessory gearbox to the at least one oil reservoir.

A further embodiment of any of the foregoing embodiments includes a first debris monitor operable to detect debris circulated through an inlet of the spool scavenge filter, and a second debris monitor operable to detect debris circulated through an inlet of the gear scavenge filter.

A method of filtering debris according to an example of the present disclosure include the steps of providing at least one spool mounted for rotation within a spool bearing compartment and a gear bearing compartment housing a geared architecture mechanically coupled to the spool, providing a spool scavenge pump stage fluidly coupled to the spool bearing compartment and a gear scavenge pump stage fluidly coupled to the gear bearing compartment, positioning a spool scavenge filter within a first flow path downstream of the spool scavenge pump stage, positioning a gear scavenge filter within a second flow path downstream of the gear scavenge pump stage, the spool and gear scavenge filters being separate and distinct, filtering fluid within the first flow path with the first scavenge filter, and filtering fluid within the second flow path with the second scavenge filter.

A further embodiment of any of the foregoing embodiments includes the steps of positioning at least one oil reservoir between the spool and gear scavenge filters and a pressure filter downstream of the at least one oil reservoir, and filtering fluid provided by the at least one oil reservoir at the pressure filter, wherein each of the spool and gear scavenge filters is operable to filter to a first level, and the pressure filter is operable to filter to a second level less than the first level.

A further embodiment of any of the foregoing embodiments includes the steps of monitoring debris within the first flow path circulated through an inlet of the spool scavenge filter and monitoring debris within the second flow path circulated through an inlet of the gear scavenge filter.

Although the different examples have the specific components shown in the illustrations, embodiments of this disclosure are not limited to those particular combinations. It is possible to use some of the components or features from one of the examples in combination with features or components from another one of the examples.

The various features and advantages of this disclosure will become apparent to those skilled in the art from the following detailed description. The drawings that accompany the detailed description can be briefly described as follows.

BRIEF DESCRIPTION OF THE DRAWINGS

The disclosure can be further understood by reference to the following detailed description when considered in connection with the accompanying drawings wherein.

DETAILED DESCRIPTION

Figure 1:
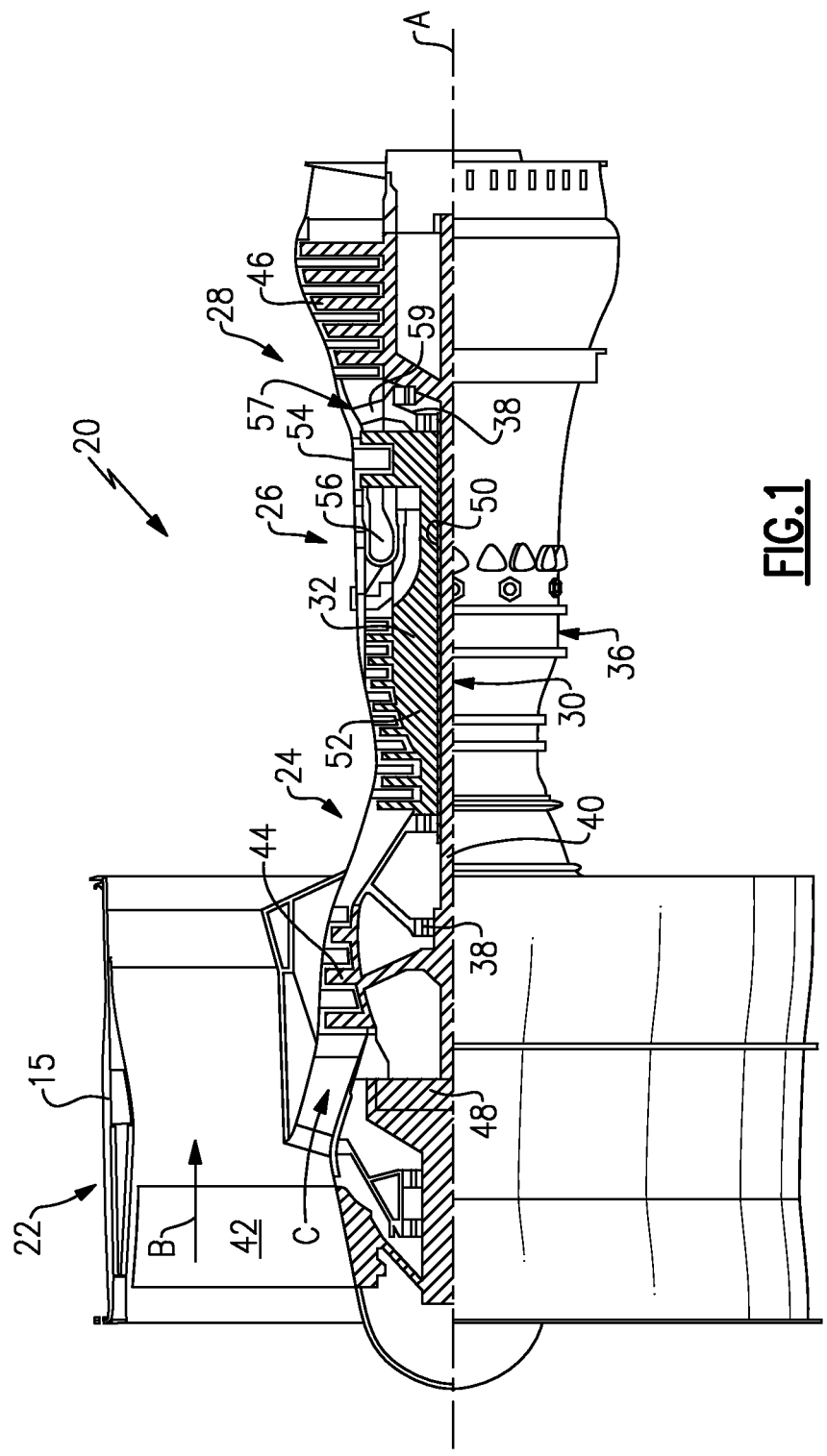
FIG. 1 schematically illustrates a geared turbofan engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]0.5. The "Low corrected fan tip speed" as disclosed herein according to one non-limiting embodiment is less than about 1150 ft/second.

Figure 2:
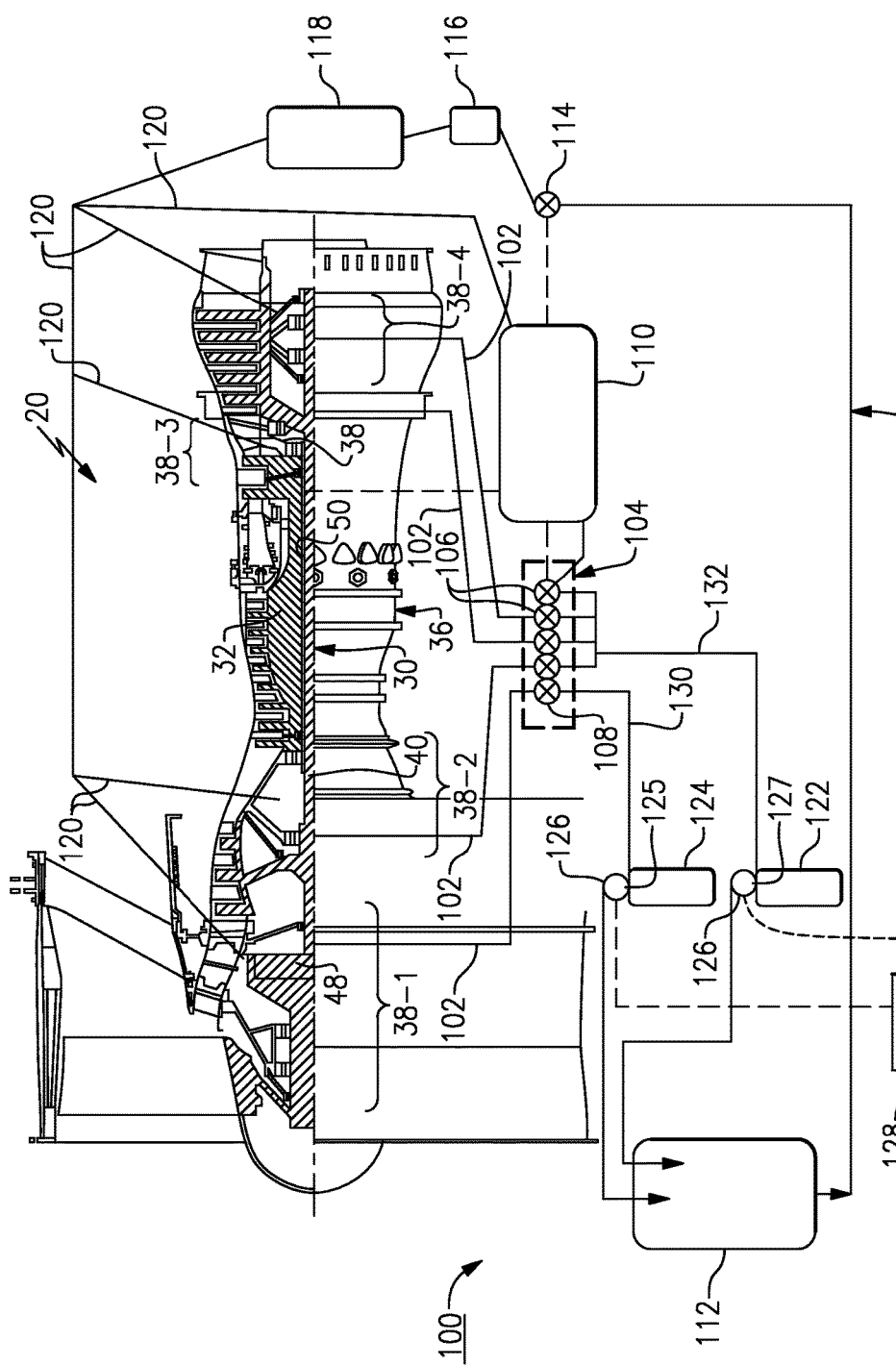
FIG. 2 is a schematic view of a geared turbofan engine including a scavenge filter system.

FIG. 2 schematically illustrates a gas turbine engine 20 including a scavenge filter system 100 for filtration of debris and other contaminants from one or more flow paths of the gas turbine engine 20. In this disclosure, like reference numerals designate like elements where appropriate and reference numerals with the addition of one-hundred or multiples thereof designate modified elements that are understood to incorporate the same features and benefits of the corresponding original elements. In this example, the scavenge filter system 100 is configured to filter a quantity of oil before being recirculated to at least one of the bearing systems or compartments 38. These include, for example, at least one of the spool bearing compartments 38-2 to 38-4, and also at least one gear bearing compartment 38-1 configured to house a geared architecture 48. However, other components of the gas turbine engine 20 configured to receive a quantity of oil, and also other systems having bearing compartments such as ground or marine-based systems, may benefit from the teachings herein.

Each of the bearing compartments 38 is configured to receive a quantity of oil from at least one oil tank or reservoir 112 fluidly coupled to the bearing compartments. The oil provides lubrication to various surfaces of the bearing compartment 38 and receives thermal energy generated by mechanical friction between the surfaces and also thermal energy rejected from other portions of the bearing compartment 38. Debris and other contaminants, such as oil impurities or debris caused by surface erosion, may be mixed with the oil as the oil flows through the bearing compartments 38. Debris in the oil flow path may undesirably cause increased friction and wear of various surfaces of the bearing compartments 38, leading to further mechanical degradation, lower overall efficiency, and lower operational availability of the engine 20.

The scavenge filter system 100 scavenges oil from the bearing compartments 38 via a plurality of scavenge lines 102 fluidly coupled to the bearing compartments 38. The scavenge filter system 100 includes a conventional scavenge pump assembly 104 having one or more spool scavenge pump stages 106 fluidly coupled to the spool bearing compartments 38-2 to 38-4, and also at least one gear scavenge pump stage 108 fluidly coupled to the gear bearing compartment 38-1. In some examples, the scavenge pump assembly 104 can house each of the spool pump stages 106 and the gear scavenge pump stage 108 in a single unit, and in other examples, each of the spool pump stages 106 and gear scavenge pump stage 108 can be a separate pump or unit. The scavenge pump assembly 104 can be driven by a conventional accessory gearbox 110. The accessory gearbox 110 is mechanically driven by an engine core rotor, such as an inner shaft 40 or an outer shaft 50 of the engine 20. However, other drive components for driving the accessory gearbox 110 are contemplated, including an electric motor or a turbine assembly, for example.

The spool pump stages 106 and the gear scavenge pump stage 108 are fluidly coupled to the oil reservoir 112 located downstream of the scavenge pump assembly 104. The oil reservoir 112 is configured to retain the quantity of oil to be recirculated or supplied to the bearing compartments 38. In some examples, the gas turbine engine 20 includes multiple oil reservoirs 112 configured to store various quantities of oil.

In some examples, the oil reservoir 112 is fluidly coupled to at least one pressure pump stage 114 positioned upstream of the oil reservoir 112 in a return flow path 113, for providing oil to the bearing compartments 38. The pressure pump stage 114 can be mechanically driven by the accessory gearbox 110 or another component of the engine 20. In some examples, a pressure filter 116 is positioned in the return flow path 113 to filter debris or contaminants from the oil before being communicated to the bearing compartments 38. The pressure filter 116 can be positioned in the return flow path 113 between the pressure pump stage 114 and the bearing compartments 38. In other examples, the pressure filter 116 is positioned in a flow path between the oil reservoir 112 and the pressure pump stage 114.

A conventional heat exchanger 118 can be positioned within the return flow path 113 to cool the oil before the oil is recirculated or supplied to the bearing compartments 38. In some examples, the heat exchanger 118 is fluidly coupled between the oil reservoir 112 and the bearing compartments 38. In other examples, the heat exchanger 118 is fluidly coupled between the scavenge pump assembly 104 and the oil reservoir 112. The heat exchanger 118 can include conventional heat exchange arrangements such as a shell-and-tube configuration. However, other conventional heat exchangers are contemplated. The cooled oil is supplied by the heat exchanger 118 to the bearing compartments 38 via a plurality of pressure supply lines 120. The accessory gearbox 110 may also receive filtered oil via an oil supply line 120 to be recirculated from the accessory gearbox 110 to the oil reservoir 112 via one of the spool scavenge pump stages 106, for example.

The scavenge filter system 100 includes at least one spool scavenge filter 122 fluidly coupled between the spool scavenge pump stages 106 and the oil reservoir 112. The scavenge pump filter system 100 also includes at least one gear scavenge filter 124 fluidly coupled between the gear scavenge pump stage 108 and the oil reservoir 112. The spool scavenge filter 122 and the gear scavenge filter 124 are operable to filter debris and other contaminants generated by the bearing compartments 38 and other components of the engine 20 fluidly coupled to the scavenge filter system 100.

Each spool scavenge filter 122 and gear scavenge filter 124 can include the same configuration or different configurations with respect to filtration levels, capacity, material, and construction. For example, each spool scavenge filter 122 can be configured to receive oil from only one of the spool bearing compartments 38-2 to 38-4, or can be configured to receive oil from more than one of the spool bearing compartments 38-2 to 38-4. In other examples, the scavenge filter system 100 includes a single spool scavenge filter 122 configured to receive oil from each of the spool bearing compartments 38-2 to 38-4. In some examples, the scavenge filter system 100 includes more than one gear scavenge filter 124 configured to receive oil from one or more locations of the gear bearing compartment 38-1, such as a geared architecture 48 defining multiple flow paths. In other examples, the scavenge filter system 100 includes only one gear scavenge filter 124. Other configurations or combinations of the spool scavenge filter 122 and gear scavenge filter 124 are contemplated. It should be appreciated that the spool scavenge filter 122 and the gear scavenge filter 124 are separate and distinct from each other, and define different flow paths within the scavenge filter system 100.

The gas turbine engine 20 can be configured such that at least some of the bearing compartments 38-1 to 38-4 have different oil demands than each other. In some examples, fluid flow in a first flow path 130 defined by the gear bearing compartment 38-1 or geared architecture 48 defines a first rate, and fluid flow in a second flow path 132 defined by the spool bearing compartments 38-2 to 38-4 defines a second rate. In some examples, the first rate is greater than the second rate. At least some of the bearing compartments 38-1 to 38-4 may require different quantities or volumes of oil, based on relative surface areas or volumes of the bearing compartments 38-1 to 38-4, for example. In one example, the bearing compartment 38-1 or the geared architecture 48 defines a first volume configured to receive a first quantity of oil, and each of the spool bearing compartments 38-2 to 38-4 defines a second volume configured to receive a second quantity of oil. It should be appreciated that the second volume of each of the spool bearing compartments 38-2 to 38-4 can be the same or different from each other. In one example, the first volume is less than the second volume. In one example, the first volume is approximately equal to or greater than the second volume. In yet another example, the first volume is greater than a sum of the second volume of each of the spool bearing compartments 38-2 to 38-4. Accordingly, having separate and distinct spool and gear scavenge filters 122, 124 can be advantageous to engine designers when considering suitable locations of the spool and scavenge filters 122, 124 within the engine 20 or airframe, and when considering suitable oil filters based on design parameters of each of the gear and spool bearing compartments 38-1 and 38-2 to 38-4.

Each of the spool and gear scavenge filters 122, 124 and the pressure filter 116 can be configured to filter debris of similar or different sizes. In some examples, each spool and gear scavenge filter 124 is operable to filter debris to a first level, and the pressure filter 116 is operable to filter debris to a second level different from the first level. In further examples, the pressure filter 116 is operable to filter to a second level which is less than the first level. In one example, the pressure filter 116 is operable to filter finer debris than the relatively more coarse debris within the flow path at the spool and gear scavenge filters 122, 124. In further examples, a ratio of the first level to the second levels is between about 40 to about 1 and about 1.33 to about 1. In another example, the first level is equal to or greater than about 100 microns. In yet another example, the first level is between about 100 microns and about 200 microns, and the second level is between about 5 microns and about 75 microns.

In other examples, the pressure filter 116 is operable to filter to a second level which is greater than the first level utilizing any of the above quantities and ratios previously discussed, for example. In still other examples, the pressure filter 116 is operable to filter to a second level which is approximately equal to the first level at the spool scavenge filter 122 and/or the gear scavenge filter 124.

The scavenge filter system 100 can include one or more conventional debris monitors 126 operable to detect debris within a flow path of the scavenge filter system 100. In some examples, each of the debris monitors 126 is located downstream of the scavenge pump assembly 104 and upstream of the oil reservoir 112. As shown in FIG. 2, the scavenge filter system 100 can include a debris monitor 126 positioned at an inlet 125 of the gear scavenge filter 124, and another debris monitor 126 positioned at an inlet 127 of the spool scavenge filter 122. The debris monitors 126 can be electrically coupled to a controller 128 for providing data, such as an indication of debris detected within the spool scavenge filter 122 and/or gear scavenge filter 124 being equal to or greater than a predetermined level. The controller 128 can be configured to provide a warning or other indication to an operator or mechanic of the gas turbine engine 20 for mission preparation or operation, and maintenance or troubleshooting of the bearing compartments 38, or other components of the engine 20 mechanically coupled to the bearing compartments 38. Accordingly, the debris monitors 126 can minimize maintenance downtime and improve operational availability of the gas turbine engine 20 and the overall system.

Conventional debris monitors can be relatively expensive to incorporate into a scavenge filter system. Accordingly, in some examples, the scavenge filter system 100 includes only one debris monitor 126 or does not include a debris monitor at all. Even without a debris monitor, or with only a single debris monitor 126, the detection of debris generated by the gear bearing compartment 38-1 can be advantageously distinguished or isolated from debris generated by the spool bearing compartments 38-2 to 38-4 based on having separate and distinct gear scavenge filters 124 and spool scavenge filters 122 defining different flow paths between the bearing compartments 38. Therefore, the scavenge filter system 100 can improve operational availability of the gas turbine engine 20 while minimizing the cost of incorporating one or more debris monitors.

Figure 3:
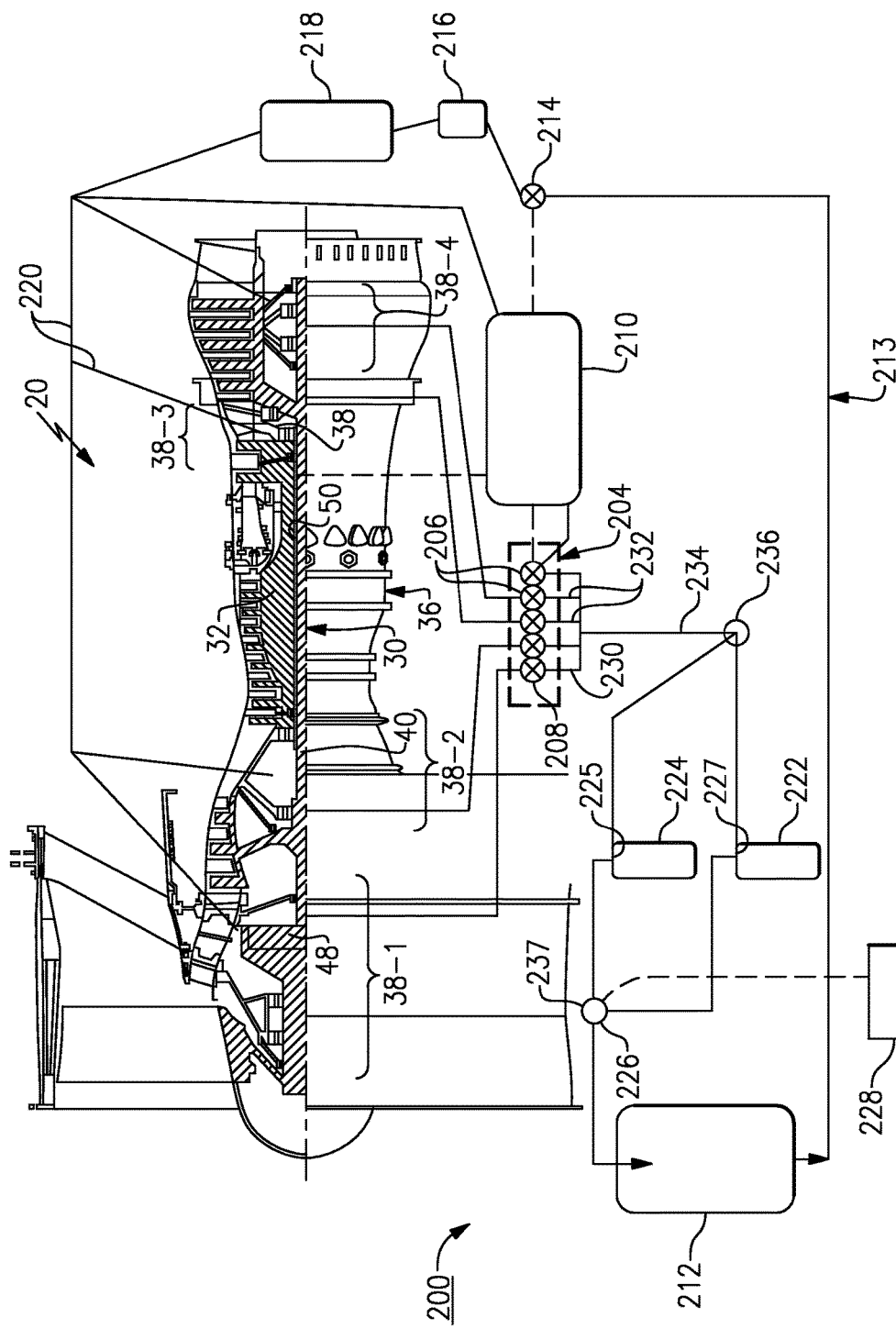
FIG. 3 is a schematic view of a geared turbofan engine including a second embodiment of the scavenge filter system.

FIG. 3 illustrates a highly schematic view of a second embodiment of the scavenge filter system 200 having an alternative oil distribution scheme. A first flow path 230 defined between a gear scavenge pump stage 208 and one or more second flow paths 232 defined between one or more spool scavenge pump stages 206 and an oil reservoir 212 are combined downstream of the spool pump stages 206 and the gear scavenge pump stage 208 into a shared flow path 234. Oil within the shared flow path 234 is distributed at a first common node 236 between the spool scavenge filter 222 and the gear scavenge filter 224. In some examples, the first common node 236 is a manifold fluidly coupled to the scavenge pump assembly 204. In other examples, the first common node 236 is a conventional valve configured to provide fluid modulation. In some examples, an approximately equal amount of oil is distributed between the spool scavenge filter 222 and the gear scavenge filter 224. In other examples, a different amount of oil is distributed between the spool scavenge filter 222 and the gear scavenge filter 224, based upon various design considerations.

The flow paths defined by the spool scavenge filter 222 and the gear scavenge filter 224 can combine downstream at a second common node 237 to be provided to the oil reservoir 212. A single debris monitor 226 can be fluidly coupled between the second common node 237 and the oil reservoir 212 to detect debris within the scavenge filter system 200.

Figure 4:
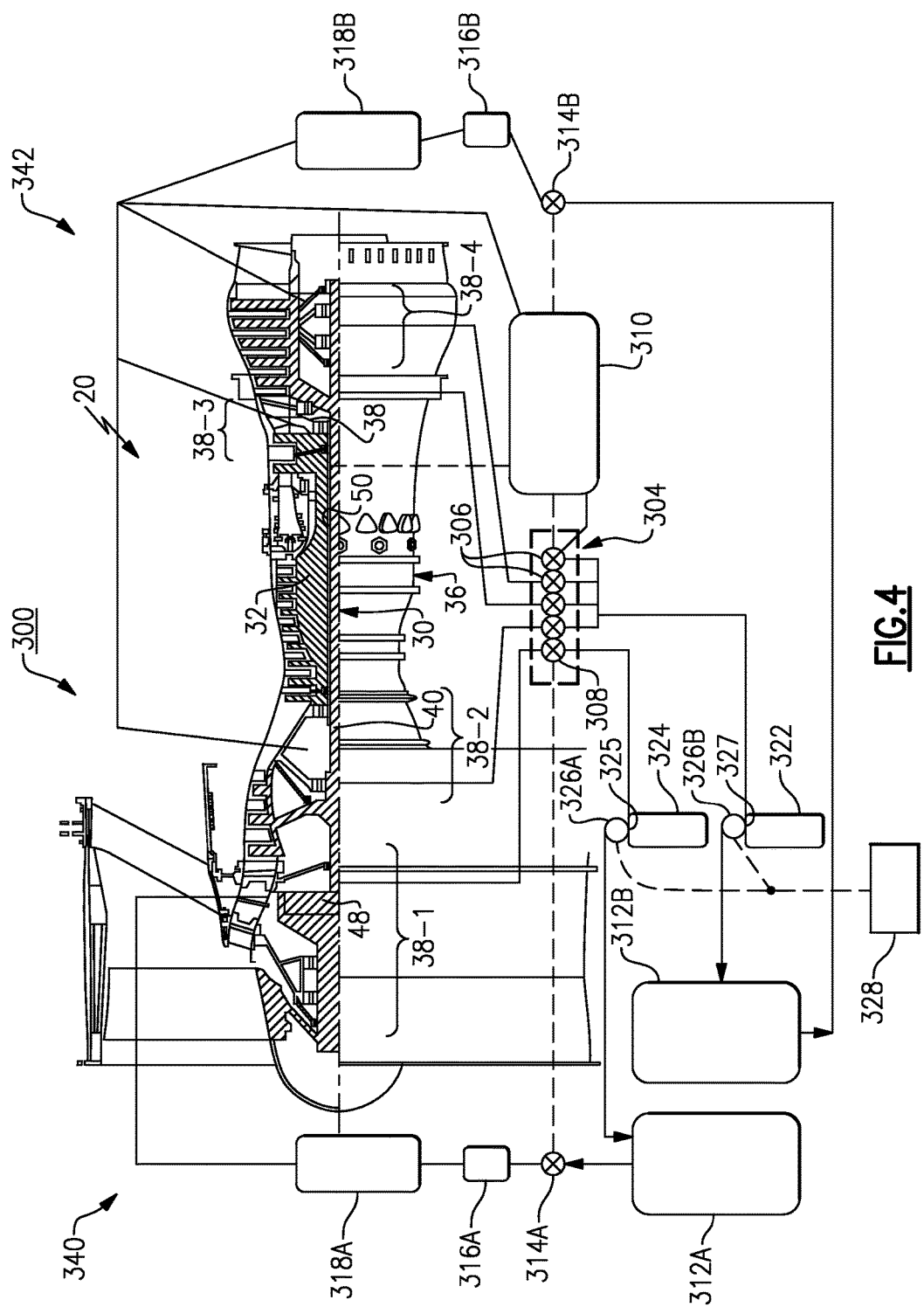
FIG. 4 a schematic view of a geared turbofan engine including a third embodiment of the scavenge filter system.

FIG. 4 illustrates a highly schematic view of a third embodiment of the scavenge filter system 300 having an independent filtration circuit for the gear bearing compartment 38-1 or geared architecture 48. A gear filtration circuit 340 is defined by the gear bearing compartment 38-1 or geared architecture 48, and at least one spool filtration circuit 342 is defined by the spool bearing compartments 38-2 to 38-4 such that the gear filtration circuit 340 and the spool filtration circuit 342 are fluidly isolated from each other. The gear filtration circuit 340 includes at least one gear scavenge filter 324 and may include a debris monitor 326A each fluidly coupled between a scavenge pump stage 308 and at least one oil reservoir 312A. The gear filtration circuit 340 can include a pressure pump stage 314A, pressure filter 316A, and heat exchanger 318A arranged in any manner previously discussed. The spool filtration circuit 342 includes at least one spool scavenge filter 322 and may include a debris monitor 326B each fluidly coupled between one or more spool scavenge pump stages 306 and at least one oil reservoir 312B. The spool filtration circuit 342 can include a pressure pump stage 314B, pressure filter 316B, and heat exchanger 318B also arranged in any manner previously discussed.

Arranging the scavenge filter system 300 to include separate and distinct gear and spool filtration circuits 340, 342 permits the engine designer to locate portions of the scavenge filter system 300 within the engine 20 or system based upon space constraints and other design considerations. The engine designer can also select suitable arrangements of the various components of the scavenge filter system 300 based on different oil cooling and filtration demands of the gear bearing compartments 38-1 and the spool bearing compartments 38-2 to 38-4. Also, maintenance personnel can further detect mechanical degradation and other conditions of the various components defining the gear and spool filtration circuits 340, 342, by the observation of debris and other contaminants collected at the gear and spool scavenge filters 324, 322, respectively, thereby improving operational availability and performance of the gas turbine engine 20.

The operation of the scavenge filter system 100, 200, 300 is as follows, and will be explained with reference to the scavenge filter system 100 for simplicity. A mixture of oil is provided to the bearing compartments 38 via the oil supply lines 120. The oil is circulated through the bearing compartments 38 and receive heat rejected from the bearing compartments 38 generated by mechanical friction. Thereafter, the scavenge pump assembly 104 removes a volume of oil via the scavenge filter lines 102. The heated oil is circulated from the scavenge pump assembly 104 through the spool scavenge filter 122 and the gear scavenge filter 124 and then to the oil reservoir 112. The oil thereafter is pumped from the oil reservoir 112 by the pressure pump stage 114 located downstream of the oil reservoir 112 to be supplied at a relatively higher pressure to the oil supply lines 120. The pressure pump stage 114 circulates the oil through the pressure filter 116 to filter debris and other contaminants and is cooled to a relatively lower temperature at the heat exchanger 118. Thereafter, the cool oil is supplied to the bearing compartments 38 to lubricate various surfaces therein.

The scavenge filter system 100, 200, 300 provides many benefits. Having a separate scavenge filter can advantageously provide for more manageable integration of the scavenge filter system 100, 200, 300 into the gas turbine engine 20 and the airframe. Further, having a gear scavenge filter allows maintenance personnel to differentiate between oil debris and other contaminants being generated by, or at least circulated through, the geared architecture 48 and the other bearing compartments 38-2 to 38-4, thereby decreasing the maintenance time to identify a condition of the gas turbine engine 20 and improving overall operational availability.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, and claimed, it should be understood that steps may be performed in any order, separated or combined unless otherwise indicated and will still benefit from the present disclosure.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A scavenge filter system comprising:
a first scavenge pump stage positioned in a first flow path downstream of a first bearing compartment of a spool;
a second scavenge pump stage positioned in a second flow path downstream of a second bearing compartment, the second bearing compartment housing a geared architecture mechanically coupled to the spool to drive a fan, the fan and the geared architecture each extending along an engine central longitudinal axis;
a first scavenge filter fluidly coupling the first scavenge pump stage to at least one oil reservoir; and
a second scavenge filter fluidly coupling the second scavenge pump stage to the at least one oil reservoir, the first and second scavenge filters being separate and distinct.

2. The scavenge filter system as recited in claim 1, wherein the first and second flow paths combine downstream of the first and second scavenge pump stages into a shared flow path, the shared flow path being distributed between the first and second scavenge filters.

3. The scavenge filter system as recited in claim 1, comprising:
a pressure filter and a heat exchanger each located in a third flow path between the oil reservoir and the first and second bearing compartments.

4. The scavenge filter system as recited in claim 3, wherein at least one of the first and second scavenge filters is operable to filter debris sized to a first level, and the pressure filter is operable to filter debris sized to a second level less than the first level.

5. The scavenge filter system as recited in claim 4, wherein a ratio of the first level to the second level is between about 40:1 and about 1.33:1.

6. The scavenge filter system as recited in claim 5, wherein the first level is equal to or greater than about 100 microns.

7. The scavenge filter system as recited in claim 6, wherein the first level is between about 100 microns and about 200 microns, and the second level is between about 5 microns and about 75 microns.

8. The scavenge filter system as recited in claim 1, comprising a first debris monitor operable to detect debris in the first scavenge filter, and a second debris monitor operable to detect debris in the second scavenge filter.

9. The scavenge filter system as recited in claim 1, wherein fluid flow in the first flow path defines a first rate, and fluid flow in the second flow path defines a second rate greater than the first rate.

10. The scavenge filter system as recited in claim 1, wherein the at least one oil reservoir is at least a first oil reservoir and a second oil reservoir, the first flow path defining a first filtration circuit and the second flow path defining a second filtration circuit fluidly isolated from the first filtration circuit, the first scavenge filter and first bearing compartment being located in the first filtration circuit, and the second scavenge filter and second bearing compartment being located in the second filtration circuit.

11. A gas turbine engine comprising:
a fan section including a fan shaft coupled to a fan;
a low speed spool and a high speed spool mounted for rotation within a plurality of spool bearing compartments, the low speed spool mechanically coupling the fan section and a compressor section to a turbine section;
a geared architecture housed within a gear bearing compartment and mechanically coupling the fan to the low speed spool to drive the fan at a lower speed than the low speed spool, the fan and the geared architecture each extending along an engine central longitudinal axis; and
a scavenge filter system including:
a plurality of spool scavenge pump stages each positioned downstream and fluidly coupled to one of the spool bearing compartments,
a gear scavenge pump stage positioned downstream and fluidly coupled to the gear bearing compartment;
a spool scavenge filter fluidly coupling the spool scavenge pump stages to at least one oil reservoir; and
a gear scavenge filter fluidly coupling the gear scavenge pump stage to the at least one oil reservoir, the spool and gear scavenge filters being separate and distinct.

12. The gas turbine engine as recited in claim 11, wherein flow paths defined by the spool scavenge pump stages and a flow path of the gear scavenge pump stage combine downstream of the spool and gear scavenge pump stages into a shared flow path distributed between the spool and gear scavenge filters.

13. The gas turbine engine as recited in claim 12, wherein the scavenge filter system includes only one debris monitor operable to detect debris circulated through the spool scavenge filter and the gear scavenge filter.

14. The gas turbine engine as recited in claim 11, wherein fluid flow in the gear bearing compartment is greater than a combined fluid flow in the spool bearing compartments.

15. The gas turbine engine as recited in claim 11, comprising:
a pressure filter and a heat exchanger located in a flow path between the at least one oil reservoir and the spool and gear bearing compartments.

16. The gas turbine engine as recited in claim 15, wherein at least one of the spool and gear scavenge filters is operable to filter debris sized to a first level, and the pressure filter is operable to filter debris sized to a second level less than the first level.

17. The gas turbine engine as recited in claim 11, comprising an accessory gearbox mechanically coupling the spool and gear pump stages to one of the spools, and the spool scavenge filter fluidly coupling the accessory gearbox to the at least one oil reservoir.

18. The gas turbine engine as recited in claim 17, wherein the turbine section includes a low pressure turbine and a high pressure turbine extending along an engine central longitudinal axis, the compressor section includes a low pressure compressor and a high pressure compressor, the geared architecture extends along the engine central longitudinal axis, the low speed spool includes an inner shaft interconnecting the low pressure turbine and the fan, the high speed spool includes an outer shaft that is concentric with the inner shaft and interconnects the high pressure turbine and the high pressure compressor, and the inner and outer shafts are rotatable about the engine central longitudinal axis.

19. The gas turbine engine as recited in claim 18, wherein the accessory gearbox is driven by the inner shaft or the outer shaft.

20. The gas turbine engine as recited in claim 11, comprising a first debris monitor operable to detect debris circulated through an inlet of the spool scavenge filter, and a second debris monitor operable to detect debris circulated through an inlet of the gear scavenge filter.

21. A method of filtering debris comprising the steps of:
providing at least one spool mounted for rotation within a spool bearing compartment and a gear bearing compartment housing a geared architecture mechanically coupled to the spool to drive a fan, the fan and the geared architecture each extending along an engine longitudinal axis;
providing a spool scavenge pump stage fluidly coupled to the spool bearing compartment and a gear scavenge pump stage fluidly coupled to the gear bearing compartment;
positioning a spool scavenge filter within a first flow path downstream of the spool scavenge pump stage;
positioning a gear scavenge filter within a second flow path downstream of the gear scavenge pump stage, the spool and gear scavenge filters being separate and distinct;
filtering fluid within the first flow path with the first scavenge filter; and
filtering fluid within the second flow path with the second scavenge filter.

22. The method as recited in claim 21, comprising the steps of:
positioning at least one oil reservoir between the spool and gear scavenge filters and a pressure filter downstream of the at least one oil reservoir; and
filtering fluid provided by the at least one oil reservoir at the pressure filter, wherein each of the spool and gear scavenge filters is operable to filter debris sized to a first level, and the pressure filter is operable to filter debris sized to a second level less than the first level.

23. The method as recited in claim 21, comprising the steps of:
monitoring debris within the first flow path circulated through an inlet of the spool scavenge filter; and
monitoring debris within the second flow path circulated through an inlet of the gear scavenge filter.

* * * * *

UNITED STATES PATENT AND TRADEMARK OFFICE
CERTIFICATE OF CORRECTION

| | | |
|---|---|---|
| PATENT NO. | : 9,849,411 B2 | Page 1 of 1 |
| APPLICATION NO. | : 14/703918 | |
| DATED | : December 26, 2017 | |
| INVENTOR(S) | : William G. Sheridan | |

It is certified that error appears in the above-identified patent and that said Letters Patent is hereby corrected as shown below:

In the Claims

In Claim 21, Column 12, Line 43; replace "the first scavenge filter" with --the spool scavenge filter--

In Claim 21, Column 12, Line 45; replace "the second scavenge filter" with --the gear scavenge filter--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*